(No Model.) 3 Sheets—Sheet 2.
F. H. VAN HOUTEN.
MACHINE FOR CUTTING AND TENONING WINDOW BLIND SLATS.
No. 543,712. Patented July 30, 1895.
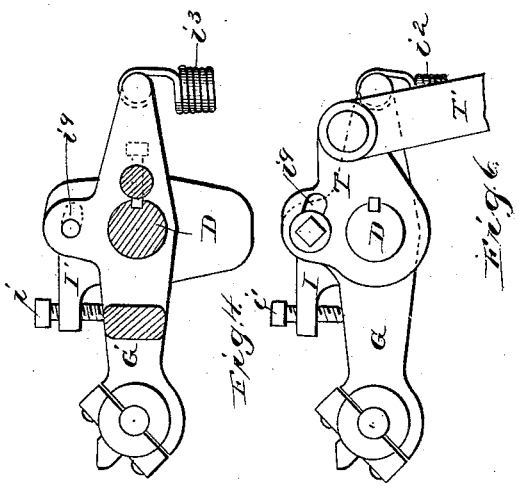
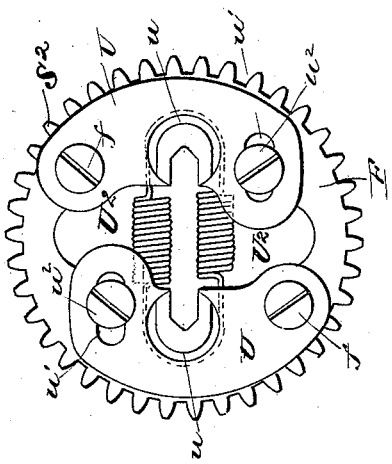
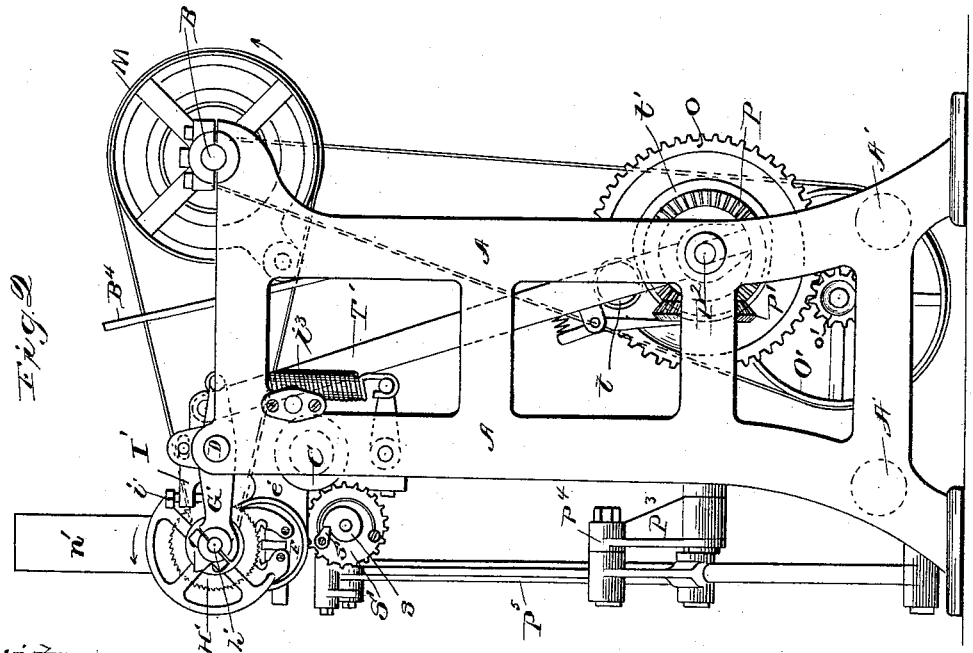
Witnesses
J. M. Fowler Jr.
Aly Stewart
Inventor
Frank H. Van Houten
By Church & Church
his Attorneys

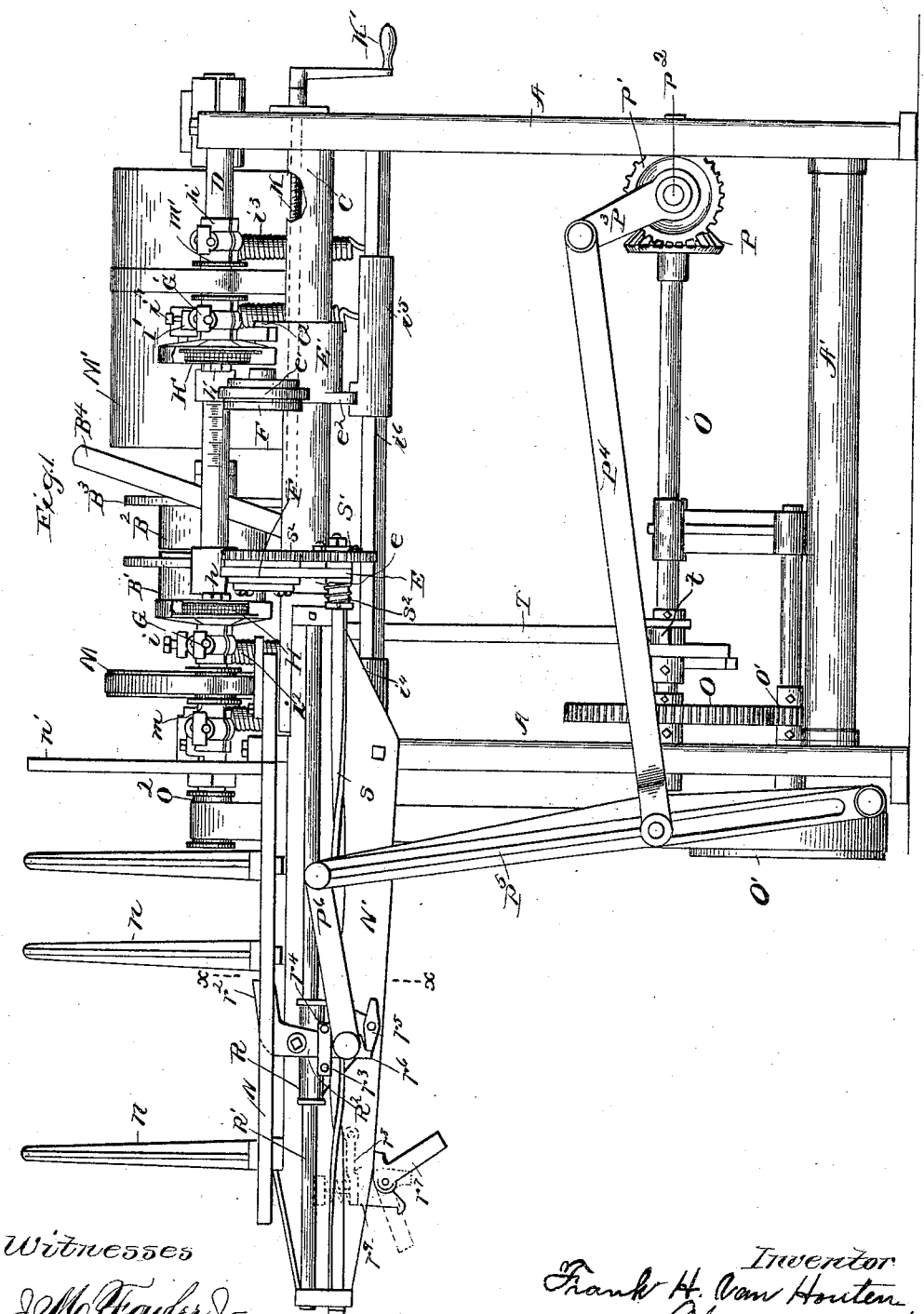

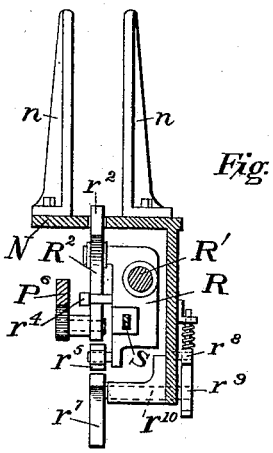
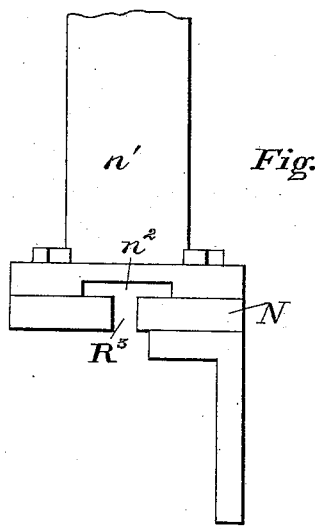
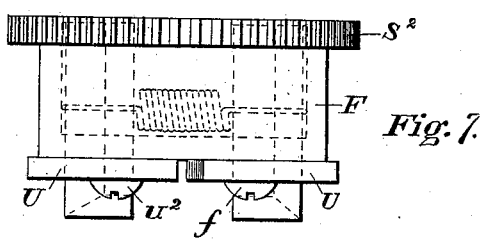
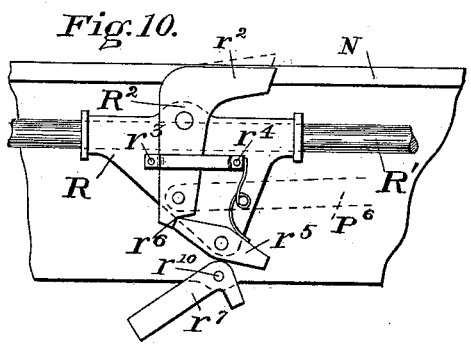
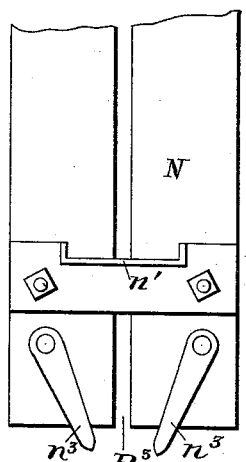
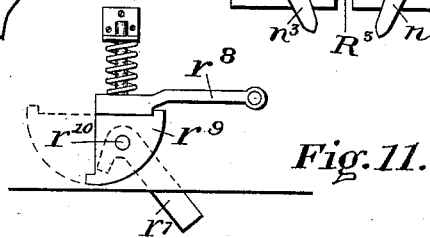

UNITED STATES PATENT OFFICE.

FRANK H. VAN HOUTEN, OF FISHKILL-ON-THE-HUDSON, NEW YORK, ASSIGNOR TO THE DUTCHESS TOOL COMPANY, OF SAME PLACE.

MACHINE FOR CUTTING AND TENONING WINDOW-BLIND SLATS.

SPECIFICATION forming part of Letters Patent No. 543,712, dated July 30, 1895.

Application filed July 21, 1893. Serial No. 481,130. (No model.)

*To all whom it may concern:*

Be it known that I, FRANK H. VAN HOUTEN, of Fishkill-on-the-Hudson, in the county of Dutchess and State of New York, have invented certain new and useful Improvements in Machines for Cutting and Tenoning Window-Blind Slats; and I do hereby declare the following to be a full, clear, and exact description of the same, reference being had to the accompanying drawings, forming a part of this specification, and to the letters of reference marked thereon.

This invention has for its object to provide an improved machine for cutting and tenoning window-blind slats which shall be simple, entirely automatic in its action, and capable of being operated with great rapidity.

The invention consists in certain novel details of construction and combinations and arrangements of parts, all as will be now described, and pointed out particularly in the appended claims.

Referring to the accompanying drawings, Figure 1 is a front elevation of a machine constructed in accordance with my present invention. Fig. 2 is an end elevation of the same. Figs. 3 and 4 are detail sectional elevations of the supports for the saw-arbors. Fig. 5 is a section on the line $xx$, Fig. 1. Fig. 6 is a detail front elevation of one of the chucks. Fig. 7 is a top plan of same; Figs. 8 and 9, details of the hopper and guides for the slats. Fig. 10 is a detail view in elevation, showing the carriage, the feed-latch, the catch holding the latch in depressed position, and the trip. Fig. 11 is a like view showing the spring-pressed arm and the block on the tripshaft for holding the trip into or out of operative position.

Like letters of reference in the several figures denote the same parts.

A metal framing is provided of any suitable design to support the working parts of the machine, preferably, however, formed by cast end frames A, connected by suitable crossbraces, such as A' A', at the bottom to form a rigid structure upon which the bearings for the shafts may be formed. At the top and rear of the main frame the drive and power shaft B is journaled in suitable bearings and carries a fast pulley B' and a loose pulley B². A belt is applied to the fast pulley for running the whole machine. In front of the fast and loose pulleys a belt-shifter B³ and shifting-lever B⁴ are mounted, so as to be conveniently moved by the operator to start or stop the machine. At the front of the frame and somewhat below the level of the driveshaft, is rigidly mounted a guide support or way C, preferably cylindrical and adapted to carry the heads upon which the chucks and saws are mounted. Above the guide C is a second shaft D, journaled in the frame to have an oscillatory movement, and upon the shaft D and guide-support C are mounted two heads E E', the one E being located at the left and held stationary by any suitable means, while E' is mounted to slide on the shaft and guide-support to vary the space between the heads. These heads are primarily designed to carry the chucks in which the slats are held during the tenoning operation, and for this purpose they are provided with forwardly-projecting webs $e\ e'$, in which bearings are formed for the reception of the said chucks, lettered F in the drawings and to be presently specifically described.

Above and just outside of the chucks and journaled in bearings formed in the outer ends of arms or levers G G' carried by the shaft D are the saws H H' and saw-arbors $h\ h'$. The arms or levers G G' are carried by the shaft D, both being mounted loosely thereon, but caused to move down when the shaft is turned forward by means of blocks I I' keyed on the shaft and having arms with set-screws $i\ i'$ bearing on the arms or levers G G'. The reverse movement is secured by means of spiral springs $i^2\ i^3$ connected to the rearwardly-extending ends of the arms G G' at the top and to carriers $i^4\ i^5$ held by a squared bar $i^6$ supported in the frame. The arms or levers and the blocks are held together and against excessive movement by pins and slots $i^9$.

The head E' has upwardly and downwardly projecting lugs $e^2$, which engage corresponding lugs on the block I' and carrier $i^5$, as shown clearly in Fig. 1. Thus all of these parts may be moved simultaneously toward and from the stationary head, and to facilitate this movement a screw K, held in bearings in the frame co-operating with threads in the head E' and rotated by means of the handle K', is provided. Thus by turning the screw the head and parts moved thereby may be shifted at will without disturbing the operative relation of the parts at all, an index being provided on shaft D to facilitate adjustment. Upon each of the saw-arbors $h\ h'$ there are mounted pulleys $m\ m'$, respectively, belted to larger pulleys M M' on the drive-shaft at the rear of the machine. The saw-arbor at the left being held against longitudinal movement, its pulleys may be made of approximately the width of the belt; but in order to allow of the free movement of the right-hand saw with the head a very wide drive-pulley M' is provided on the drive-shaft, and the small pulley $m'$ is flanged to retain the belt in place as the head is shifted.

The saws are of the usual variety employed in tenoning machinery—that is to say, a saw of large diameter to cut off the work is located on the outside and a series of saws of smaller diameter secured against the same. Thus assuming that a slat has been placed in the chucks, which are then given a slow rotary motion, it will be seen at once that if the saws are brought down by turning the shaft D the ends of the slat will be cut off and tenons formed thereon by the saws.

The machine contemplates the complete automatic handling of the slats, and for this purpose a feed-table N is arranged on a web N' of the frame at the left-hand end of the machine, with its upper surface in line with the chucks, and upon this table I form a hopper by means of adjustable uprights $n$, between which the slats are stacked. The forward end of the hopper is formed by a broad upright $n'$, in the base of which a channel $n^2$ is formed for the passage of the slats, and forward of the hopper two laterally-adjustable guides $n^3$ are secured in position to guide the slats into the chucks as they are forced forward out of the hopper.

In the base of the main frame is journaled a shaft O, driven through the medium of the gear and pinion $o\ o'$ and pulley O', belted to the pulley $O^2$ on the left-hand end of the drive-shaft. Shaft O is provided with a bevel-gear P, meshing with a similar wheel P' on the shaft $P^2$, carrying the crank $P^3$ at the end. Crank $P^3$ connects by means of the pitman $P^4$ with a feed-lever $P^5$, pivoted to the bottom of the frame and adapted to feed the slats forward and to rotate the chuck. This is accomplished by means of the carriage R, connected to the upper end of the lever by means of the link $P^6$ and sliding on the guide R' beneath the feed-table. Carriage R has a feed-latch or bell-crank lever $R^2$ pivoted thereon, one arm $r^2$ of which is adapted to project up through the central slot $R^3$ in the feed-table, while the opposite end is connected to the link $P^6$, the connection between the link and carriage being thus formed through the bell-crank feed-latch. The feed-latch has a movement on the carriage limited by the stops $r^3\ r^4$, and in operation it will be seen that as the link draws forward on the lower arm of the feed-latch the other arm will be projected above the table in position to feed a slat forward, and when the motion of the link is reversed the end of the latch is lowered for the return movement, the latch, after being moved against its stops, causing the carriage to travel along its ways.

In order to positively prevent the upper end of the feed-latch from rising during the return movement or to hold the same out of operation, a catch $r^5$ is pivoted on the carriage and adapted to enter a notch $r^6$ in the lower arm of the feed-latch whenever the latter is pushed back. The under side of this catch or pawl $r^5$ is straight, and at the outer end of the table a trip $r^7$ is journaled and adapted to be thrown into position to strike the catch and force it out of engagement with the feed-latch or to be thrown out of position, so as to allow the catch to hold the feed-latch out of operative position all the while. The trip is held in one position or the other by the spring-pressed pivoted arm $r^8$, which co-operates with one or the other of the straight surfaces of the block $r^9$ on the trip-shaft. It will be seen that by turning the trip-shaft so as to present a different one of the straight or flat surfaces of the block $r^9$ to the pivoted arm $r^8$ the trip may be held in position to actuate the feed-latch or out of operative position, as desired.

Below the guideway for the carriage there is journaled a spiral S, the spiral portion beginning a short distance from the ends and making one complete revolution. Thus, with a properly-shaped opening in the carriage for the passage of the spiral, when said carriage is reciprocated the spiral will be turned first forward and then back. This movement of the spiral is utilized to rotate the chuck at the left side, for which purpose a gear-wheel S' is mounted on the end of the spiral in position to mesh with the gear-wheel or the toothed periphery $S^2$ of the chuck. The gear-wheel S' is journaled loosely on the spiral, or, more properly, it is journaled in the web of the stationary head and the shaft passes through it and is adapted to rotate it in one direction only, or only during the retrograde movement of the carriage, this being accomplished by means of the collar $s$, notched at one point, mounted on the shaft, and the pawl $s'$ on the wheel S, with a friction-spring $S^2$ for holding the wheel against backward movement.

To depress the saws at the proper time after the slats have been fed into the chucks by the feed-latch and carriage, the block I, Fig. 4, is formed with a rearwardly-extending arm T, to which the upper end of the connecting-rod T' is jointed. This connecting-rod is bifurcated at the bottom to straddle the shaft, and at one side carries an antifriction-roller $t$, which rests on the periphery of the cam $t'$, carried by the shaft. The cam $t'$ is graduated to raise the connecting-rod and depress the saws only during the retrograde movement of the feeder, this being an easy matter to regulate, because the carriage makes but a single reciprocation to each revolution of the shaft. Thus when the chucks are stationary the saws are elevated, and as the chucks rotate, carrying the slat, the saws descend, cut the ends, and form the tenon.

If reference be now had to Figs. 6 and 7, it will be seen that the chucks are formed by a circular body portion F, having a central opening and upon which are mounted, within the outer circumference pivoted chuck-jaws U, two in number, and each having a recess adapted to approximately fit one edge of the slats, the recesses being V shape to insure a proper centering of the slat and are formed in what might be termed the "elongated hub" $u$ of the jaws, which are thus made to perform the function of guides to maintain the horizontal position of the slats as they are being inserted or pushed out. The jaws U are pivotally connected to the body F by screws $f$, and at the opposite ends are provided with slots $u'$, through which guide and clamping screws $u^2$ pass. Springs $U^2$, passing around the elongated hubs of the jaws, tend to draw them together. The entrance end of the jaws are, of course, beveled off to facilitate the entry of the slats. In use one of the jaws is adjusted to bring the slats of the width being operated upon to a proper center and clamped firmly in position by the screw $u^2$. The cooperating jaw is left loose. Thus the slat is clamped by spring-pressure and accurately centered.

The operation of the machine is simple, for having determined the length of slat desired the movable head is set along to the proper point and slats piled into the hopper on the feed-table. Then the power-belt having been shifted to the fast pulley and the feeder is started to reciprocating. The attendant then throws the trip into position to cause the release of the feed-latch as the feeder reaches the rear extreme of its movement, the bottom slat being then fed forward into the jaws of the chucks as the feeder advances. The saws are all the while being rotated from the drive-shaft, and as the feeder again starts back the saw-operating cam comes into action, depressing the saws. Simultaneously the chucks are rotated by the spiral, and the saws thus not only cut the slats to the proper length, but cut the ends away, so as to form tenons at each end. This having been accomplished the saws are elevated by the springs, and the carriage having reached the rear end of its movement is ready to advance another slat, which latter pushes the slat already tenoned out of the machine.

Having thus described my invention, what I claim as new is—

1. In a slat tenoning machine, the combination with the drive shaft, the rotary chucks mounted in stationary bearings, and the feeder for delivering the slats to be tenoned to the chucks and means driven by the feeder for rotating the said chucks, of the rotary saws mounted in oscillatory bearings and arranged to move outside of the chucks; substantially as described.

2. In a slat tenoning machine, the combination with the drive shaft, the rotary chucks mounted in stationary bearings, the reciprocatory feeder working toward and from said chucks and means driven by the feeder for rotating said chucks during the backward movement of the feeder, of the rotary saws for cutting and tenoning the ends of the slats; substantially as described.

3. In a slat tenoning machine, the combination with the hopper, the rotary chucks, the reciprocating feeder delivering the slats from the hopper to the chucks and means driven by said feeder for rotating said chucks, of the saws arranged to cut the ends of the slats; substantially as described.

4. In a slat tenoning machine the combination with the rotary chucks, the feeder delivering slats to the chucks and means driven by the feeder for rotating said chucks, of the rotary saws arranged to move into operative positions outside the chucks when the feeder is on its backward stroke.

5. In a slat tenoning machine, the combination with the drive shaft and the feeder, of a rotary chuck arranged to be positively operated by the feeder, a second rotary chuck arranged to be rotated in unison with the first named chuck by means of a slat placed in said chucks, and saws arranged to simultaneously cut the ends of the slat.

6. In a slat tenoning machine, the combination with the drive shaft, the rotary chuck mounted in stationary bearings, the reciprocating feeder, the spiral rotated by the feeder, and gearing connecting the spiral and chuck whereby the latter is rotated, of the saws for cutting and tenoning the slats; substantially as described.

7. In a tenoning machine, the combination with the drive shaft and the rotary chuck mounted in stationary bearings, of the reciprocatory feeder, the spiral rotated by the feeder, gearing connecting the spiral and chuck, a pawl and cooperating member for permitting the chuck to remain at rest while the feeder is advancing, and the saws for cutting and tenoning the ends of the slat; substantially as described.

8. In a tenoning machine, the combination with the drive shaft, and the rotary chuck mounted in stationary bearings, of the reciprocatory feeder, the spiral rotated by the feeder, a gear wheel for driving the chuck, a pawl and ratchet wheel interposed between the spiral and gear wheel, for rotating the chuck when the feeder is moving in one direction, and the saws for cutting and tenoning the ends of the slats while held in the chuck; substantially as described.

9. In a slat tenoning machine the combination with the rotary chuck and swinging saw both fixed against longitudinal movement, of a rotary chuck and saw adjustable toward and from the fixed chuck and saw respectively, a reciprocating feeder arranged to deliver slats to the chucks and means driven by the feeder for rotating the fixed chuck; substantially as described.

10. In a tenoning machine the combination with the feed-table, a rotary chuck fixed against longitudinal movement at one end of said table, a second rotary chuck adjustable toward and from the fixed chuck, a feeder for automatically feeding the slats to be cut along the table into the chucks, and means driven by the feeder for rotating the chucks, of rotary saws arranged to be moved into operative positions outside the chucks.

11. In a tenoning machine the combination with the frame having ways or shafts, the feed-table, the reciprocating feeder and the rotary chuck and tenoning saw each having a fixed position at the end of the feed-table, and means driven by the feeder for rotating the chuck, of a chuck and a tenoning saw adjustable on the ways toward and from the fixed chuck and saw respectively, and means connecting the adjustable chuck and the adjustable saw for movement together.

12. In a slat tenoning machine, the combination with the rotary chucks, the feeder delivering slats to be cut to the chucks and means driven by the feeder for rotating said chucks, of the rotary saws, the oscillatory shaft, supports or arms bearing the saws and loosely mounted on said shaft, the block secured rigidly on said shaft, the link connected to one of said arms for oscillating the shaft and the spring connected to said block for returning the shaft to its normal position.

13. In a slat tenoning machine the combination with the rotary chucks of the saws, the feeder delivering slats to be cut to the chucks on its forward stroke and means driven by the feeder for rotating the chucks during the return stroke of said feeder.

14. In a slat tenoning machine the combination with the drive shaft, the rotary chucks and the saws secured upon arms, of the feeder delivering slats to the chucks, means driven by the feeder for rotating the chucks, and a shaft driven from the drive shaft and provided with means for oscilliating the saws and reciprocating the feeder.

15. In a tenoning machine, the combination with the rotary chuck and rotary saw fixed against longitudinal movement, of a rotary chuck and a rotary saw adjustable toward and from the fixed chuck and saw respectively, a feeder delivering the slats endwise into the chucks and means driven by said feeder for rotating said chucks.

16. In a slat tenoning machine, the combination with the rotary chucks, the oscillatory shaft, the saw mounted in a support or arm carried by said shaft and held against longitudinal movement thereon, a second support or arm adjustably mounted on said shaft, a saw journaled in said adjustable support or arm with gearing for driving said saws; substantially as described.

17. In a tenoning machine the combination with the saws, of a feed table, a reciprocatory feeder for delivering the slats to be cut on its forward stroke and a chuck for receiving the slats, and means driven by said feeder for rotating said chucks.

18. In a slat tenoning machine, the combination with the rotary chucks and rotary oscillating tenoning saws, of the reciprocating feeder, means driven by the feeder for rotating the chucks, the pivoted lever connected with the feeder, the crank connected with said lever, the drive shaft, gearing connecting said drive shaft and saws, and gearing connecting said drive shaft and the crank shaft for operating the feeders; substantially as described.

19. In a slat tenoning machine, the combination with the chucks and tenoning saws, of a reciprocating carriage arranged to rotate the chucks, the pivoted feed latch mounted in the carriage for cooperation with the slats to feed the same, the operating lever for said carriage, means driven thereby for rotating the chucks and a link connecting said latch and lever, whereby the latch is raised as the carriage is moved forward and depressed as the carriage retreats; substantially as described.

20. In a slat tenoning machine, the combination with the chucks and tenoning saws, of the feed table, the reciprocating carriage beneath the table, the feed latch pivoted on said carriage, the operating lever connected with said latch and a catch for holding said latch depressed when it is not desired to feed the slats; substantially as described.

21. In a slat tenoning machine, the combination with the chucks and tenoning saws, of the feed table, the carriage reciprocating parallel with the same, the feed latch adapted to project above the table pivoted on the carriage, the operating lever connected with said latch, the catch for holding said latch depressed and the trip for throwing said catch out of engagement with the latch, substantially as described.

22. In a slat tenoning machine, the combination with the chucks, and tenoning saws, the feed table, carriage oscillating beneath the same, the latch pivoted on said carriage and adapted to project above the table, the operating lever connected with said latch for raising and depressing the same during alternate movements of the carriage, the catch cooperating with the latch to hold the same depressed and the pivoted trip cooperating with said catch to release the latch and the spring for holding said trip in or out of operative position; substantially as described.

23. In a slat tenoning machine the combination with the tenoning saws of a rotary chuck comprising a body, a jaw pivoted at one end and adjustably secured at its other to the body, and a second jaw pivoted at one end oppositely with respect to the first-named jaw and having its other end free to move,— said jaws being spring-pressed toward each other; substantially as described.

FRANK H. VAN HOUTEN.

Witnesses:
JOHN F. SCHLOSSER,
BELLA WILSON.